(12) United States Patent
Arold

(10) Patent No.: US 6,210,265 B1
(45) Date of Patent: Apr. 3, 2001

(54) VENTILATION DEVICE FOR VEHICLES AND METHOD OF MAKING SAME

(75) Inventor: Klaus Arold, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/449,361

(22) Filed: Nov. 24, 1999

(30) Foreign Application Priority Data

Nov. 26, 1998 (DE) ............................................. 198 54 539

(51) Int. Cl.[7] .............................. B60H 1/34; F24F 13/14
(52) U.S. Cl. ........................................... 454/152; 454/335
(58) Field of Search ................................... 454/152, 155, 454/322, 325, 333, 335

(56) References Cited

U.S. PATENT DOCUMENTS 5,853,323 * 12/1998 Beck et al. ........................... 454/156

FOREIGN PATENT DOCUMENTS

| | | |
|---|---|---|
| 19539849 | 4/1997 | (DE). |
| 19639321 | 9/1997 | (DE). |
| 1.534.866 * | 10/1968 | (FR) ................................... 454/156 |

* cited by examiner

*Primary Examiner*—Harold Joyce
(74) *Attorney, Agent, or Firm*—Evenson, McKeown, Edwards & Lenahan, P.L.L.C.

(57) ABSTRACT

A ventilating device for vehicles with a housing has at least one air outlet for mounting an air guide part and at least one louvered shutter for metering the quantity of air flowing out through the at least one air outlet. The air outlet has a frame that is circumferential and sealed off from the housing and a plurality of shutter strips pivotably secured in the frame. To simplify the design of the ventilating device and reduce the assembly time, the louvered shutter is pushed into the air inlet and the shutter frame is provided on its outer end pointing away from the housing with a circumferential internal rib, said rib, together with an external rib that is circumferential and concentric relative to the housing, forming a circumferential U-profile for inserting a seal that fits over the edge of the end of the air guide part.

22 Claims, 1 Drawing Sheet

VENTILATION DEVICE FOR VEHICLES AND METHOD OF MAKING SAME

BACKGROUND AND SUMMARY OF THE INVENTION

The invention relates to a ventilating device for a vehicle heating or air conditioning system, comprising a housing having at least one air outlet for mounting an air guide part, and at least one louvered shutter for metering the quantity of air flowing out through the at least one air outlet, said shutter having a circumferential sealing frame sealed off from the housing and a plurality of shutter strips pivotably secured in the shutter frame.

A known ventilating device of this kind integrated into an air conditioner box of an air conditioner [German Patent Document DE 196 39 321 C1] has a middle channel departing from a mixing air chamber and a side channel departing from the middle channel, and both are made integral with the housing of the air conditioner box. In addition to the mixing air chamber, a cold air channel and a warm air channel are provided in the housing, both of which terminate in the mixing air chamber. An air nozzle, permanently installed in the interior of the vehicle, in the instrument panel for example, is mounted at each of the endwise mounted air outlets of the middle channel and side channel. A mixing air flap in the form of a louvered shutter is provided at the outlet of the mixing air chamber and at the inlet of the middle channel, by which shutter the quantity of air-conditioned air flowing from the mixing air chamber into the middle channel and into the side channel is controlled. An embodiment of a design of such a louvered shutter is shown and described in detail in German Patent Document No. DE 44 42 000 A1. By contrast with pivotable air flaps, louvered shutters have the advantage that they require less free space inside the housing for opening and closing.

An air distributor box of a heating or air conditioning system for vehicles is known [German Patent Document No. DE 195 39 849 A1] by which a plurality of air nozzles permanently installed in the interior of the vehicle are supplied with warm air, cold air, or air conditioned air. Each air nozzle is connected to an air channel formed integrally in the air distributor box, said channel being lined internally with an absorbent material. The absorbent material is pulled over a flange formed at the free end of the air channel and the air nozzle together with the end of its nozzle housing is pushed into this portion of absorbent material pulled over the flange so that an air-tight connection is formed between the air channel and the air nozzle. At the end of the air channel facing away from the air nozzle, an air flap is pivotably mounted that can be pivoted by an adjusting lever into one of two end positions in which it alternatively blocks the air channel or exposes it completely.

A goal of the invention is to simplify the design of a ventilating device of the species recited at the outset, thus reducing manufacturing cost.

The goal is achieved according to the invention by providing a ventilating device of the kind referred to above, wherein a louvered shutter with a shutter frame is inserted into the air outlet, preferably flush therewith, and wherein the shutter frame, on its outer end facing away from the housing, has a circumferential internal rib which, together with an external rib running concentrically relative to the housing, forms a circumferential U-shaped profile for inserting a circumferential seal that fits over the end of the guide part.

The ventilating device according to the invention has the advantage that the louvered shutter for controlling the (at least one) air outlet when the housing is mounted endwise is simply inserted into the air outlet and thus simultaneously forms a receptacle with the housing for air-tight mounting of the air guide part, especially an air nozzle. In this way, housing shapes for integrating the louvered shutter that are costly from the manufacturing standpoint plus the simplified assembly significantly reduce the assembly time.

Advantageous embodiments of the ventilating device according to the invention with advantageous designs and improvements on the invention are described herein and in the claims.

According to one advantageous embodiment of the invention, the louvered shutter is simply clipped into the housing and the seal relative to the housing is created by a tongue-and-groove connection formed between the inner face of the shutter frame and a circumferential shoulder formed in the housing against which the louvered shutter fits flush.

Other objects, advantages and novel features of the present invention will become apparent from the following detailed description of the invention when considered in conjunction with the accompanying drawings.

DETAILED DESCRIPTION OF THE DRAWINGS

Figure 1:
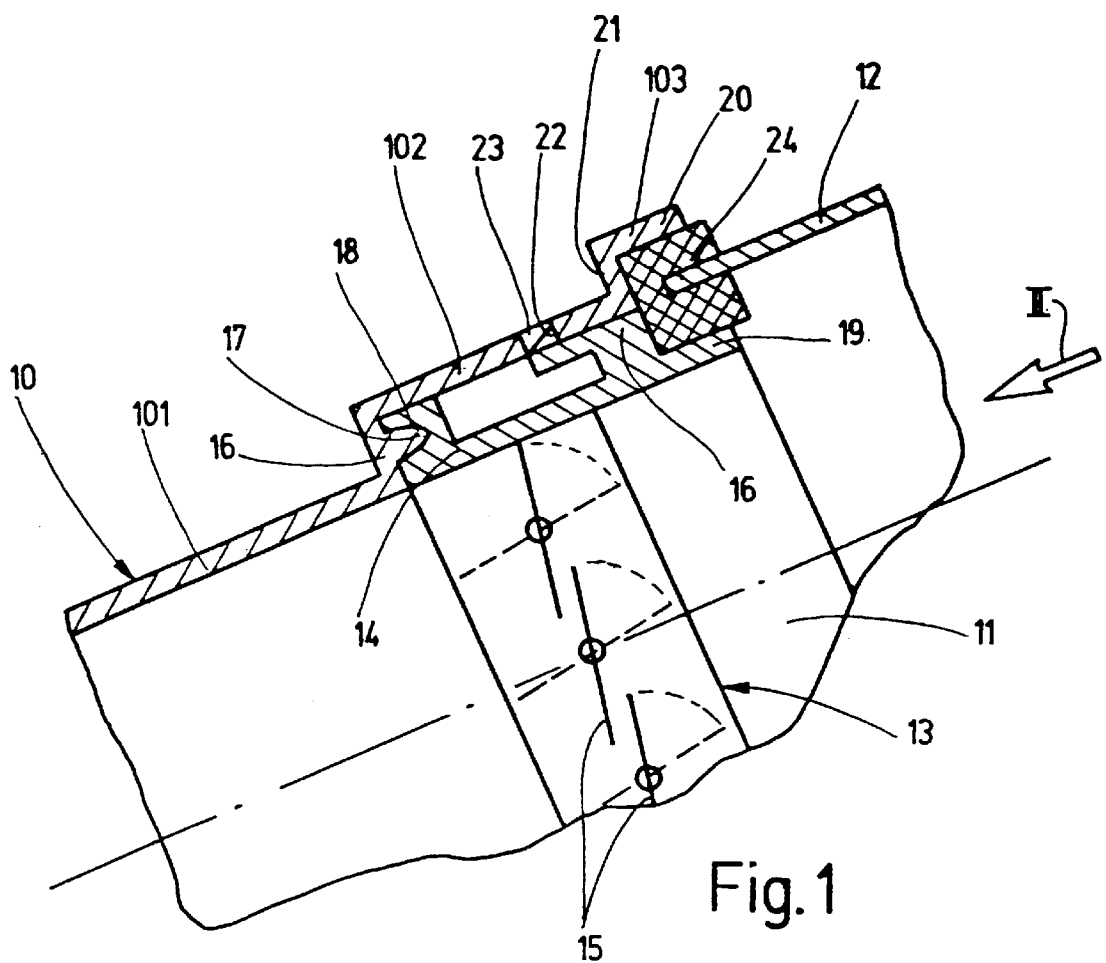
FIG. 1 is a part sectional view which shows portions of a lengthwise section of a ventilating device for vehicles, constructed according to a preferred embodiment of the invention.
Figure 2:
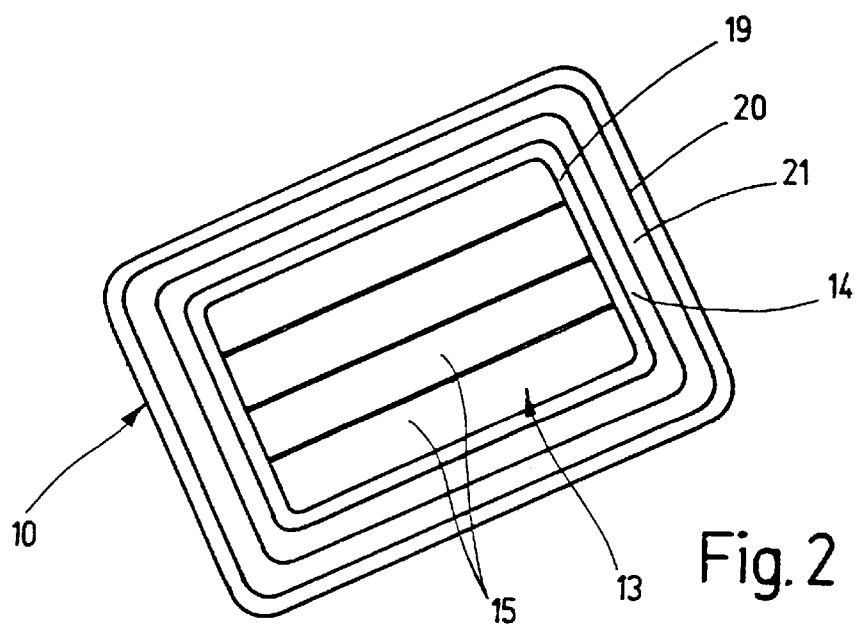
FIG. 2 is a view of the ventilating device looking in the direction of arrow II in FIG. 1 with the air guide part removed.

The ventilating device for a vehicle shown partially in a lengthwise section in FIG. 1 has a housing 10 in which at least one air outlet 11 is formed for mounting an air guide part 12. The air guide part 12 can be an air nozzle or a connecting line or an air channel installed inside the vehicle, for example in the instrument panel, which connects the air nozzle with housing 10. To meter the quantity of air flowing out through air outlet 11, a louvered shutter 13 is provided which comprises in known fashion a shutter frame 14 and a plurality of shutter blades 15 pivotably secured in shutter frame 14. This louvered shutter 13 is inserted into air outlet 11, is flush with the latter, and is sealed air-tight relative to housing 10. For this purpose, a circumferential radial shoulder 16 is formed in housing 10 in the vicinity of air outlet 11 by having housing 10 staggered relative to air outlet 11 and having an end portion with a larger diameter so that the radial shoulder 16 is produced by the transition from section 101 of housing 10 with the smaller diameter to section 102 of housing 10 with the larger diameter. The radial width of shoulder 16 corresponds to the width of shutter frame 15 so that the shutter frame can be mounted flush against shoulder 16, so that the inside walls of shutter frame 14 and housing section 101 are flush with one another. The distance of shoulder 16 from the free end of air outlet 11 is chosen so that the face of the shutter frame 14 facing away from shoulder 16 is flush with the end of housing 10. Between housing shoulder 16 and the inner face of shutter frame 14 resting thereon, a circumferential seal in the form of a tongue 17 formed on shoulder 16 and a groove 18 formed in the end of shutter frame 14 is located.

Shutter frame 14, on its outer face directed away from housing 10, has a circumferential internal rib 19 located so that it is flush at the inner edge of shutter frame 14 with the inside wall of frame 14 and has a rib width that is smaller than the frame width. A circumferential external rib 20 is formed concentrically with respect to internal rib 19 on housing 10 so that internal rib 19 and external rib 20 form a U-shaped profile that surrounds air outlet 11 concentrically. The external rib 20, formed integrally with housing 10, then projects at right angles from an outwardly projecting flange 21 of housing 10. This is accomplished by an additional housing section 103 with a diameter larger than the diameter of housing section 102 being formed on housing 10, so that the transition from housing section 102 to housing section 103 forms flange 21. Housing 10 and shutter frame 14 are preferably made of plastic by the injection molding process, with shoulder 16, tongue 17 formed therein, flange 21, and external rib 20 as well as groove 18 and internal rib 19 being injection molded at the same time.

Shutter frame 14 is secured in air outlet 11 against falling out by a clip connection, for which purpose latching noses 22 are provided on the outside of shutter frame 14 and distributed over the circumference. These noses snap into matching latching holes 23 in housing 10, specifically in its central housing portion 102. Alternatively, shutter frame 14 can also be screwed to housing 10.

A circumferential seal 24 is inserted into the circumferential U-shaped profile formed by internal rib 19 on shutter frame 14 and external rib 20 on housing 10, said seal fitting over the rigid end of housing guide part 12. This design feature of housing 10 in the vicinity of air inlet 11 and shutter frame 14 permits very simple assembly of the ventilating device, so that an air-tight connection to the mounting location of air guide part 12 on air outlet 11 is guaranteed at the same time without additional expense.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Ventilating device a vehicle heating or air conditioning system, comprising:
    a housing having at least one air outlet for mounting an air guide part, and at least one louvered shutter for metering the quantity of air flowing out through the at least one air outlet, said shutter having a circumferential sealing frame sealed off from the housing and a plurality of shutter strips pivotably secured in the shutter frame,
    wherein the louvered shutter with a shutter frame is inserted into the air outlet, and
    wherein the shutter frame, on its outer end facing away from the housing, has a circumferential internal rib which, together with an external rib running concentrically relative to the housing, forms a circumferential U-shaped profile for inserting a circumferential seal that fits over the end of the guide part.

2. Ventilating device according to claim 1, wherein the internal rib is made integrally with the shutter frame and is located at an inner edge of the shutter frame and flush with an inside wall of the shutter frame, said internal rib having a rib width that is less than the frame width, and
    wherein the external rib that is made integral with the housing projects at right angles from an outwardly projecting flange of the housing, parallel to the housing axis.

3. Ventilating device according to claim 1, wherein the housing and shutter frame are each made of plastic by an injection molding method.

4. Ventilating device according to claim 2, wherein the housing and shutter frame are each made of plastic by an injection molding method, said ribs being injection molded simultaneously with the housing and shutter frame.

5. Ventilating device according to claim 2, wherein the housing has a circumferential shoulder in the vicinity of the air outlet, with the width of the shoulder corresponding to the frame width of the shutter frame and located at a distance from the end of the housing such that when the shutter frame is placed on the shoulder the internal ribs on the shutter frame and the external ribs on the housing are flush with one another.

6. Ventilating device according to claim 5, wherein the housing and shutter frame are each made of plastic by an injection molding method, said ribs being injection molded simultaneously with the housing and shutter frame.

7. Ventilating device according to claim 1, wherein a circumferential seal is located between the housing shoulder and the inner end of the shutter frame resting thereon in order to seal the shutter frame with respect to the housing.

8. Ventilating device according to claim 7, wherein the circumferential seal is made in the form of a tongue-and-groove connection.

9. Ventilating device according to claim 1, wherein the shutter frame is clipped into the housing.

10. Ventilating device according to claim 9, wherein latching noses are provided on the outside of the shutter frame and distributed over its circumference, said latching noses being configured to snap into matching latching holes in the housing.

11. Ventilating device according to claim 1, wherein the shutter frame is screwed onto the housing.

12. Ventilating device according to claim 1, wherein the louvered frame and the shutter frame are configured to be flush with the air outlet when inserted therein.

13. Ventilating device according to claim 2, wherein the louvered frame and the shutter frame are configured to be flush with the air outlet when inserted therein.

14. A method of making a ventilating device a vehicle heating or air conditioning system, comprising:
    molding a plastic housing having at least one air outlet for mounting an air guide part, and
    molding at least one plastic louvered shutter for metering the quantity of air flowing out through the at least one air outlet, said shutter having a circumferential sealing frame sealed off from the housing and a plurality of shutter strips pivotably secured in the shutter frame,
    wherein the louvered shutter with a shutter frame is inserted into the air outlet, and
    wherein the shutter frame, on its outer end facing away from the housing, has a circumferential internal rib which, together with an external rib running concentrically relative to the housing, forms a circumferential U-shaped profile for inserting a circumferential seal that fits over the end of the guide part.

15. A method according to claim 14, wherein the internal rib is made integrally with the shutter frame and is located at an inner edge of the shutter frame and flush with an inside wall of the shutter frame, said internal rib having a rib width that is less than the frame width, and
    wherein the external rib that is made integral with the housing projects at right angles from an outwardly projecting flange of the housing, parallel to the housing axis.

16. A method according to claim 15, wherein the housing has a circumferential shoulder in the vicinity of the air outlet, with the width of the shoulder corresponding to the frame width of the shutter frame and located at a distance from the end of the housing such that when the shutter frame is placed on the shoulder the internal ribs on the shutter frame and the external ribs on the housing are flush with one another.

17. A method according to claim 14, wherein a circumferential seal is located between the housing shoulder and the inner end of the shutter frame resting thereon in order to seal the shutter frame with respect to the housing.

18. A method according to claim 17, wherein the circumferential seal is made in the form of a tongue-and-groove connection.

19. A method according to claim 14, wherein the shutter frame is clipped into the housing.

20. A method according to claim 19, wherein latching noses are provided on the outside of the shutter frame and distributed over its circumference, said latching noses being configured to snap into matching latching holes in the housing.

21. A method according to claim 14, wherein the shutter frame is screwed onto the housing.

22. A method according to claim 14, wherein the louvered frame and the shutter frame are configured to be flush with the air outlet when inserted therein.

* * * * *